United States Patent
Conway et al.

(10) Patent No.: US 7,194,517 B2
(45) Date of Patent: Mar. 20, 2007

(54) SYSTEM AND METHOD FOR LOW OVERHEAD MESSAGE PASSING BETWEEN DOMAINS IN A PARTITIONED SERVER

(75) Inventors: Patrick N. Conway, Los Altos, CA (US); Jeremy J. Farrell, Campbell, CA (US); Kazunori Masuyama, Kanazawa (JP); Takeshi Shimizu, Sunnyvale, CA (US); Sudheer Miryala, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 727 days.

(21) Appl. No.: 10/154,100

(22) Filed: May 21, 2002

(65) Prior Publication Data

US 2003/0023666 A1     Jan. 30, 2003

Related U.S. Application Data

(60) Provisional application No. 60/301,953, filed on Jun. 28, 2001.

(51) Int. Cl.
  *G06F 15/167*   (2006.01)
  *G06F 12/00*   (2006.01)
(52) U.S. Cl. .............. 709/212; 709/201; 709/214; 711/200; 711/202; 711/220; 711/221
(58) Field of Classification Search .......... 709/206, 709/212, 214, 216, 218, 201; 711/200, 202, 711/220, 221
See application file for complete search history.

(56) References Cited

U.S. PATENT DOCUMENTS

| | | | | |
|---|---|---|---|---|
| 5,276,806 A | * | 1/1994 | Sandberg et al. ........... 709/213 |
| 5,430,844 A | * | 7/1995 | Shitara et al. ............... 710/26 |
| 5,561,780 A | * | 10/1996 | Glew et al. ................. 711/126 |
| 5,588,120 A | * | 12/1996 | Shitara et al. .............. 709/212 |
| 5,671,374 A | * | 9/1997 | Postman et al. ............. 710/305 |
| 5,732,244 A | * | 3/1998 | Gujral ....................... 711/141 |
| 5,859,990 A | * | 1/1999 | Yarch ......................... 710/33 |
| 6,003,122 A | * | 12/1999 | Yarch et al. ................ 711/201 |
| 6,026,448 A | * | 2/2000 | Goldrian et al. ............ 709/212 |
| 6,161,160 A | * | 12/2000 | Niu et al. ................... 710/310 |
| 6,792,513 B2 | * | 9/2004 | Bade et al. ................. 711/147 |

\* cited by examiner

*Primary Examiner*—Zarni Maung
*Assistant Examiner*—V. Korobov
(74) *Attorney, Agent, or Firm*—Fenwick & West LLP

(57) ABSTRACT

A system and method for passing messages between domains with low overhead in a multi-node computer system. A CPU node in a sending domain issues a request to a memory node in a receiving domain using memory-mapped input/output window. This causes the message to be transmitted to a coherent space of the receiving domain. All messages are cache-line in size. A small portion of each cache line, cyclic counter field, is overwritten before the cache line is written in the coherent address space of the receiving domain. A massaging driver polls the cyclic count field of the cache line in the processor cache to determine when the next message is written in the coherent address space of the receiving domain. This allows the CPU to detect when the last received message is written into the coherent address space of the receiving domain without generating transactions on CPU interface.

12 Claims, 14 Drawing Sheets

| Receive Base Field 510 | H/W Write Pointer field 520 | Cache Line Offset field 530 |
|---|---|---|

SYSTEM AND METHOD FOR LOW OVERHEAD MESSAGE PASSING BETWEEN DOMAINS IN A PARTITIONED SERVER

RELATED APPLICATION

This application claims priority under 35 U.S.C. § 119(e) to U.S. Provisional Application No. 60/301,953, filed Jun. 28, 2001, and entitled "SYSTEM AND METHOD FOR LOW OVERHEAD MESSAGE PASSING BETWEEN DOMAINS IN A PARTITIONED SERVER" by Patrick N. Conway, Jeremy J. Farrell, Kazunori Masuyama, Takeshi Shimizu, and Sudheer Miryala, which is incorporated by reference herein in its entirety.

FIELD OF THE INVENTION

The present invention relates generally to the logical partitioning of a multi-node computer system, and more specifically, to message passing between domains in a partitioned computer system.

BACKGROUND OF THE INVENTION

Multi-node computer systems may be partitioned into domains, with each domain functioning as an independent machine with its own address space. An operating system runs separately on each domain. Partitioning permits the resources of a computer network to be efficiently allocated to different tasks, to provide flexibility in the use of a computer system, and to provide isolation between computer resources to limit the effects of hardware or software faults in one part of the network from interfering with the operation of the entire system. The domains are isolated from one another so that a domain cannot directly read from or write to the shared address space of another domain.

Conventional messaging mechanisms for passing messages between domains in a partitioned computer system are known. For example, conventional implementations perform messaging from an input/output (I/O) device in one domain (sending domain) to an I/O in another domain (receiving domain). This approach presents several disadvantages. First, it requires a direct memory access (DMA) read in a sending domain such that an I/O network interface controller reads data from memory in the sending domain. It further requires a DMA write such that an I/O network interface controller writes data to memory in a receiving domain. Each DMA transfer incurs an additional overhead of processor I/O accesses.

Second, since the messaging driver runs over a network protocol stack, round trip latency for short messages becomes quite long. Moreover, conventional implementation requires polling a hardware (H/W) write pointer register to indicate when valid data arrives in the receiving domain. Polling the H/W write pointer register generates transactions on processor interface that result in high bandwidth overhead. Furthermore, because fragmentation of messages occurs in network routers/switches, messages may arrive in fragments that are less than cache-line in size. Such transfers of data are inefficient because they waste bandwidth in an interconnect and increase overhead in memory.

Therefore, it is desirable to have a mechanism that would allow the system to pass cache-line size messages between domains. Further, it is desirable to provide an in-memory notification when valid data arrives in the receiving domain without generating transactions on processor interface.

SUMMARY OF THE INVENTION

The present invention includes a distributed multi-node computer system comprising a plurality of central processor unit (CPU) nodes, input/output (I/O) nodes, and memory nodes connected via an interconnect (as shown in FIG. 1). A CPU node may include a cache memory. The computer system is partitioned into a plurality of domains, with each domain functioning as an independent machine with its own address space. An operating system runs separately on each domain.

The present invention also includes memory accesses with pipelining. More particularly, it includes a messaging mechanism that allows a CPU node in one domain to make a request to a memory node in another domain. A domain from which a request is issued is referred to as a sending domain. A domain that receives the request is referred to as a receiving domain. A CPU node in the sending domain writes to the part of the address space of the receiving domain where I/O nodes are addressed at certain reserved addresses. This part of the address space is called a memory-mapped input/output (MMIO) window. Each write to a MMIO window is cache-line in size. A destination domain (receiving domain) is decoded from the address used to access the MMIO window. Writing to the MMIO window in the sending domain triggers a launch of the message to the receiving domain. All messages are cache-line in size.

On the receiving side, the receiving domain receives the message and writes the message in the coherent address space to a message receive buffer. A small portion of each cache line called a cyclic counter field is overwritten with a cyclic counter before the cache line is written in the coherent address space of the receiving domain. The cyclic counter is relatively prime with respect to the size of the message receive buffer. A messaging driver polls the cyclic count field of the cache line in the processor cache to determine when the next message is written in the message receive buffer. The last cache line written is detected when the cyclic sequence in the cyclic count field of sequentially addressed cache lines is broken. Maintaining a cyclic counter with modulus relatively prime with respect to the size of the message receive buffer assures that a break in the sequence indicating where a last cache line is written will always appear when a new cache line arrives. Thus, the cyclic counter beneficially provides in memory notification without generating a transaction on the CPU interface.

BRIEF DESCRIPTION OF THE DRAWINGS

FIG. 5B illustrates an address format used to access the message receive buffer of the embodiment of FIG. 5A.

DETAILED DESCRIPTION OF THE INVENTION

Figure 1:
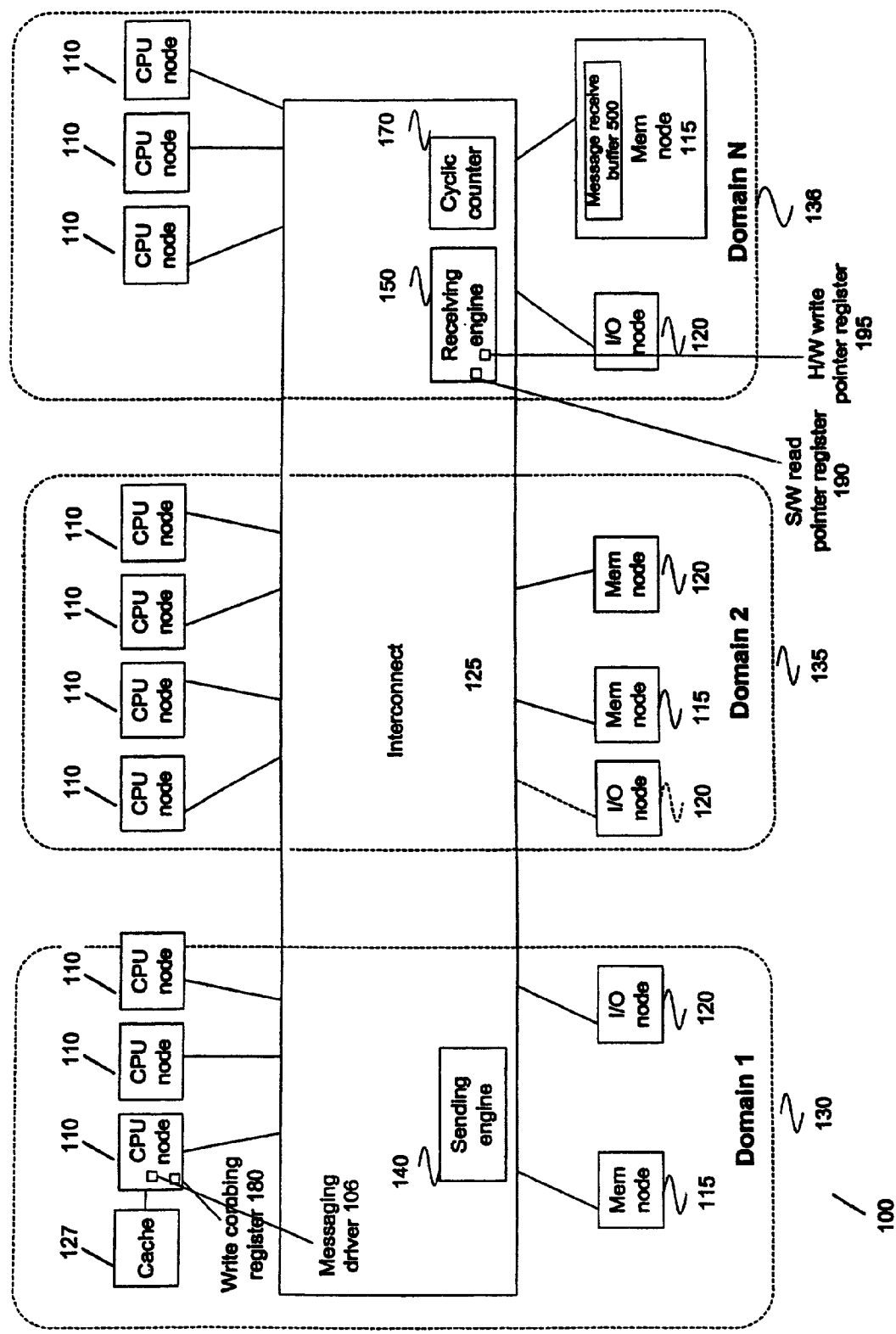
FIG. 1 is a block diagram of an overall architecture of a multi-node computer system partitioned into a plurality of domains in accordance with an embodiment of the present invention.

Referring now to FIG. 1, there is shown a block diagram of an overall architecture of a multi-node computer system 100 that is partitioned into a plurality of domains for passing messages between domains. Each domain 130, 135, and 136 includes a plurality of nodes: central processing unit (CPU) nodes 110a–110n (generally 110); memory nodes 115a–115n (115); and input/output ("I/O") nodes 120a–120n (120).

The CPU node 110 is a conventional processing unit, for example, an Intel or Intel-compatible Itanium™ class or higher processor, a Sun SPARC™ class or higher processor, or an IBM/Motorola PowerPC™ class or higher processor. Each CPU node 110 preferably includes a processor cache 127. The I/O node 120 is a conventional I/O system, for example, a storage device, an input device, a network interface controller, a peripheral device, or the like. The memory node 115 is a conventional memory system, for example, a dynamic random access memory (DRAM) system, a static random access memory (SRAM) system, or the like. Nodes 110, 115, and 120 in system 100 are connected via interconnect 125. Interconnect 125 couples two or more nodes so that instructions, data, and other signals may be passed between each node. Interconnect 125 may be, for example, a mesh, ring or hypercube implemented using routers or switches.

Nodes 110, 115, 120 in system 100 are grouped into domains. It should be understood that although only three domains 130, 135, 136 are shown in FIG. 1 for ease of explanation, system 100 could be partitioned into any number of domains. Each domain 130, 135, 136 of system 100 functions as an independent machine with its own address space which is only accessible to the nodes within the domain. Each domain 130, 135, and 136 can also send a message to itself. Domains 130, 135, and 136 are isolated from one another so that neither domain can directly read from or write to the shared address space of another domain. A domain from which a request is issued is a sending domain. A domain to which a message is written is a receiving domain.

Figure 2:
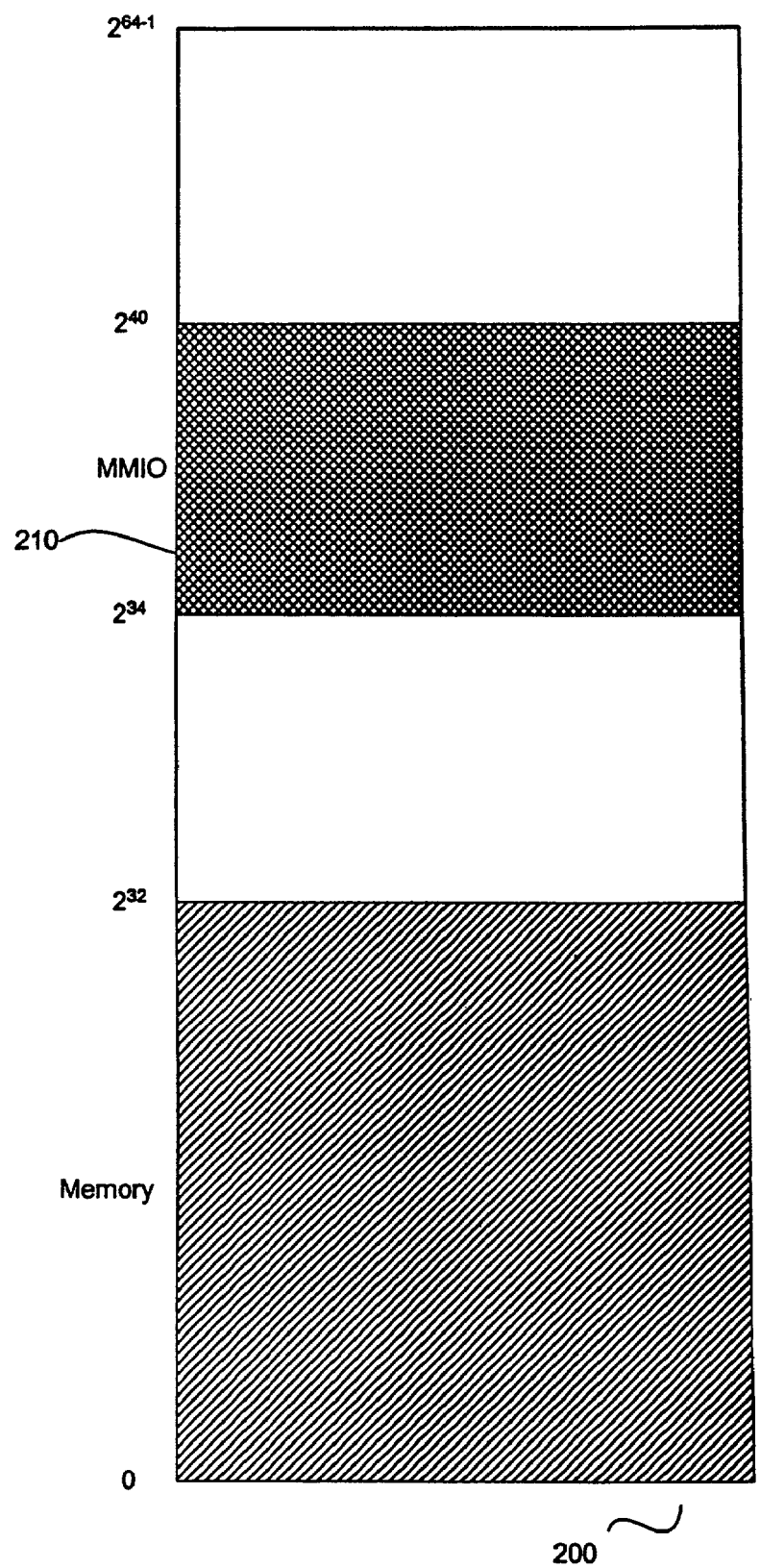
FIG. 2 is a block diagram of the address space of a sending domain according to an embodiment of the present invention.

Referring now to FIG. 2, there is shown an address space 200 of sending domain 130 of system 100. Address space 200 has a set of memory addresses for accessing memory structures within the domain. Address space 200 starts at 0 and has a size of $2^{64}$ bits. In the example of FIG. 2, any address between 0 and $2^{32}$ maintains reference to memory 115. Any address between $2^{34}$ and $2^{40}$ maintains reference to the memory mapped input output (MMIO) window 210. A base register that resides in Interconnect 125 (not shown in FIG. 2) is preferably programmed to indicate where MMIO window 210 starts in the coherent space 200 of sending domain 130. It should be noted that each domain in system 100 has a MMIO window in its address space.

Referring again to FIG. 1, in one embodiment of the present invention, CPU node 110 of domain 130 makes a request to memory node 115 of domain 136. Domain 130 is a sending domain. Domain 136 is a receiving domain. It should be understood that any domain can be a sending domain and a receiving domain. In one embodiment of the present invention, a CPU node 110 in the sending domain 130 makes a request to a memory node 115 in receiving domain 136 using an active messaging mechanism. The active messaging mechanism allows CPU node 110 in the sending domain 130 to issue a write request to MMIO window 210 in the address space of sending domain 130. Writing requests to MMIO window 210 triggers the launch of a message to receiving domain 136. Each message is cache-line in size. Receiving domain 136 receives the message and writes the message into the coherent address space of the receiving domain 136. The coherent address space describes a region of memory where instructions and data used by software reside. The coherent address space of the receiving domain 136 is shown below in FIG. 5A. In one embodiment of the present invention, the messages are written in a message receive buffer residing in the coherent address space of the receiving domain 136. The message receive buffer is an area in memory where cache-line sized messages are written and from which the messages are read. The message receive buffer is described in more detail below in connection with FIG. 5A.

System 100 further comprises a messaging driver 106 for executing CPU 110 instructions. Messaging driver 106 is adapted to perform a sequence of operations in a loop. Messaging driver 106 waits (if necessary) for the next message to arrive in receiving domain 136, copies the message out of message receive buffer 500, and passes the message on to some other software. Messaging driver 106 can be implemented as software, hardware, or any combination thereof.

System 100 further comprises a sending engine 140 residing in interconnect 125 of the sending domain 130. Sending Engine 140 is preferably adapted to decode the destination domain from a MMIO address used in the write request to MMIO window 210. The MMIO address is described below in connection with FIG. 3. Sending engine 140 further launches the message to receiving engine 150.

Receiving engine 150 resides in interconnect 125 of the receiving domain 136. Receiving engine 150 is preferably adapted to receive the message from sending engine 140 and to write the received message to the coherent address space of the receiving domain 136.

Receiving Engine 150 further comprises a software (S/W) read pointer register 190. The S/W read pointer register 190 contains a value, a S/W read pointer 190a. S/W read pointer register 190 allows receiving engine 150 to determine a number of free entries in the message receive buffer. S/W read pointer register 190 and S/W read pointer 190a are described below in more detail in connection with FIGS. 5A, 5B.

Receiving Engine 150 further comprises a hardware (H/W) write pointer register 195. The H/W writer pointer register 195 stores a value, a H/W write pointer 195a. H/W write pointer register 195 and H/W write pointer 195a are described below in more detail in connection with FIGS. 5A, 5B.

The present invention advantageously allows system 100 to gather a sequence of write requests and combine them before writing to coherent address space 590 of receiving domain 136. In one embodiment, a write combining attribute allows CPU 110 to internally combine a sequence of writes into an on-chip cache-line write combining register 180 (shown in FIG. 1) so that all bytes of a cache line will be sent in one transfer. Performing message data transfers that are cache-line in size reduces protocol overhead as well as reduces memory resource utilization. In one embodiment of the present invention, a write combining attribute is supported by the Intel Itanium processor. In another embodiment, a write combining attribute is Uncached Accelerated, which is supported by the MIPS R12000 processor.

Figure 3:
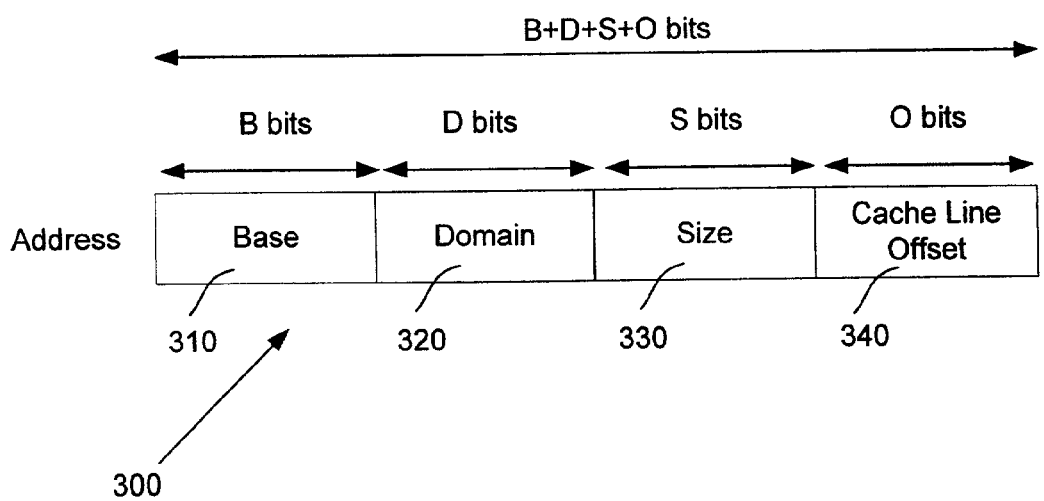
FIG. 3 is a block diagram of a preferred format of an address used to access the MMIO window in the address space of the sending domain.

Referring now to FIG. 3, there is shown a block diagram of a preferred format of address 300 used to access MMIO Window 210 of FIG. 2. The address preferably includes the following fields: base field 310, domain field 320, size field 330, and cache line offset field 340.

Base field 310 stores value that is compared to a value stored in a base register (not shown) to determine whether the received request is a message request. The value stored in the base register indicates where MMIO window 210 starts in the address space of sending domain 130.

Domain field 320 is D bits wide, and it indicates a destination domain. The present invention supports $2^D$ domains. When CPU 110 issues a write to MMIO window 210, sending engine 140 decodes a destination domain (also called the receiving domain) of the request to memory by reading domain field 320 from address 300.

Size field 330, which is S bits wide, specifies the number of entries for each destination domain in MMIO window 210. Each destination domain has $2^S$ entries. Cache line offset 340 is an offset of a byte in its cache line used to identify a particular byte.

Figure 4:
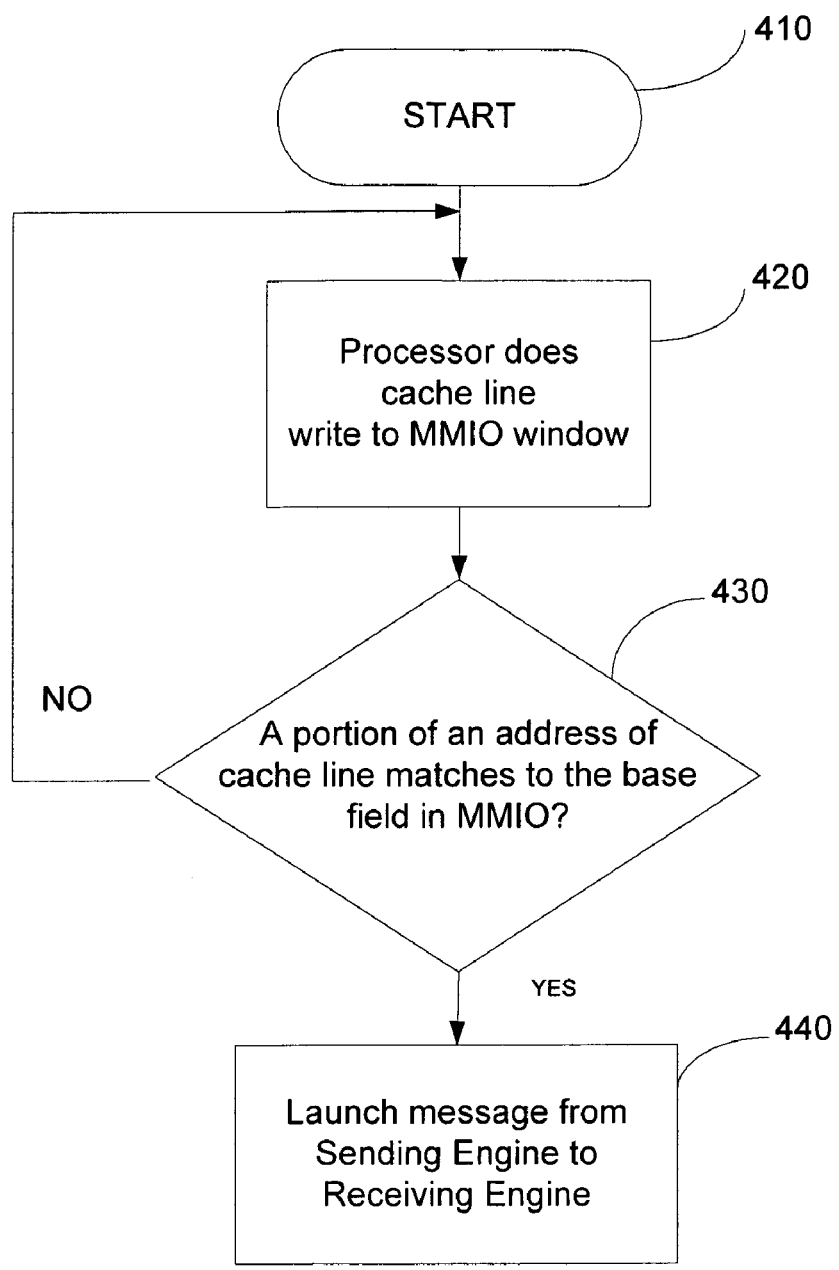
FIG. 4 is a flow chart of a message passing protocol performed by the embodiment of FIG. 1 in the sending domain.

Referring now to FIG. 4, there is shown a flow chart of a message passing protocol performed in the sending domain 130. The process starts 410 and CPU 110 issues a cache-line size write 420 to MMIO window 210. All units of data having the same cache line address are internally gathered up in register 180. Once register 180 fills, it is automatically flushed and appears as a non-coherent cache-line size write transaction on CPU 110 interface. All the write requests provided by the CPU 110 are examined. If base field 310 of MMIO address 300 matches 430 the value contained in the base register, it indicates that the write request is a message. Sending engine 140 decodes the destination domain from address 300 used in the write request to MMIO window 210. Sending engine 140 further launches 440 the message to receiving engine 150. Receiving engine 150 writes the message to the coherent address space of receiving domain 136. The message passing protocol performed in the receiving domain 136 is described below in more detail in connection with FIG. 6.

Figure 5A:
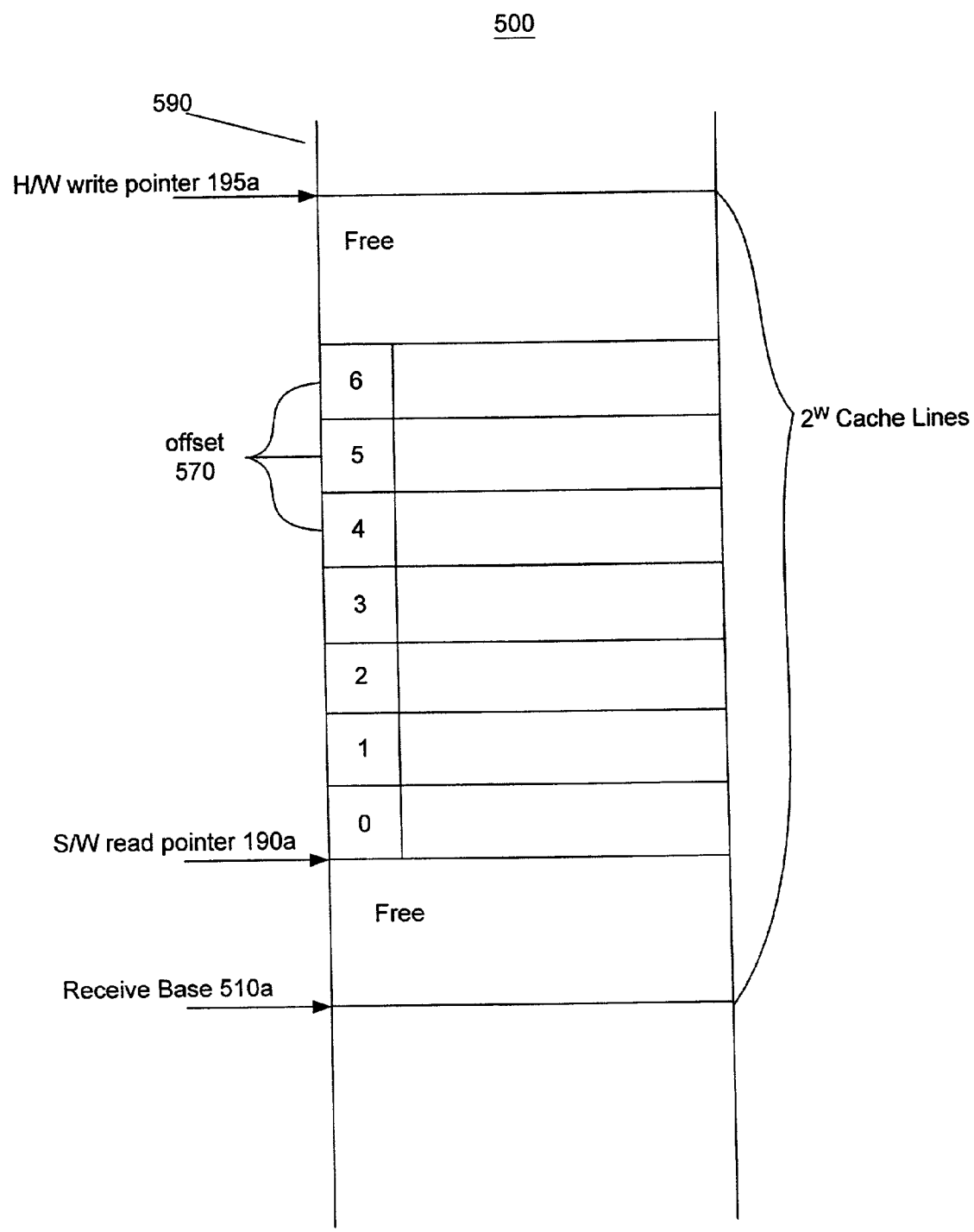
FIG. 5A is a block diagram of a message receive buffer residing in memory of a receiving domain in one embodiment of the present invention.

Referring now to FIG. 5A, there is shown a block diagram of the message receive buffer 500 in the coherent address space 590 of receiving domain 136 according to an embodiment of the present invention. Message receive buffer 500 has a plurality of entries. Each entry is identified by a number. Each entry preferably stores a cache-line sized message when it arrives to the receiving domain 136. The first entry has number 0, the second entry has number 1, the third entry has number 2, and so on. These numbers are the entries' "offsets" 570 in message receive buffer 500. Offsets 570 are the values used by S/W read pointer 190a and H/W write pointer 195a to identify a particular entry. As shown in FIG. 5A, S/W read pointer 190a points to the first entry (with an offset "0") in message receive buffer 500. H/W write pointer 195a points to the last entry (with an offset "6") in message receive buffer 500. Receive base address 510a points to the area indicating where message receive buffer 500 starts in coherent address space 590. Receiving engine 150 (not shown in FIG. 5A) writes cache-line size messages to message receive buffer 500 in address sequential order.

Referring now to FIG. 5B, it illustrates a format of an address 540 used to access message receive buffer 500. Address 540 preferably comprises the following fields: receive base field 510, a hardware (H/W) write pointer field 520, and an offset field 530.

Receive base field 510 preferably stores receive base address 510a indicating where message receive buffer 500 starts in the coherent address space of receiving domain 136. The receive base address 510a stored in receive base field 510 is a programmed constant.

H/W write pointer field 520 stores current value of H/W write pointer 195a (shown in FIG. 5A). Field 520 is used to determine the address of the cache line in message receive buffer 500 to which a new message will be written.

Cache line offset field 530 is identical to cache line offset field 340 shown in FIG. 3. Cache line offset field 530 is an offset of a byte in its cache line. For example, if the offset field 530 is 0, address 540 refers to the first byte of the cache line; if the offset field 530 is 3, the address 540 refers to the fourth byte, and so on. If the cache line size is 128 bytes, the offset field 530 can have values from 0 to 127 to allow each byte in the cache line to be addressed.

Referring again to FIG. 5A, in operation, when Receiving Engine 150 has written a cache-line sized message to the last entry in the message receive buffer 500, the next received message is written to the first entry in the message receive buffer 500. As an illustrative example, if the received message is written to the first entry in the message receive buffer 500, the H/W write pointer 195a is 0; if the next message will be written to the second entry in the message receive buffer 500, the H/W write pointer 195a is 1; and so on. When Receiving Engine 150 has received a new message, it uses the current value of the H/W write pointer 195a as H/W write pointer field 520 to determine the address of the cache line in message receive buffer 500 to which Receiving Engine 150 will write the message. Receiving engine 150 then increments the H/W write pointer 135a stored in H/W writer pointer register 195; H/W write pointer 195a now points to the next entry in message receive buffer 500 where a new message will be written. H/W writer pointer register 195 is W bits wide, and incrementing its maximum H/W write pointer 195a value causes it to wrap around to 0.

Messaging driver 106 updates S/W read pointer 190a to indicate that it has finished processing the message so that the cache line entry in message receive buffer 500 containing the message is now available to the Receiving Engine 150 to store a new message. As an illustrative example, once the Messaging driver 106 has successfully read a message from the first entry (offset 0), it sets the S/W read pointer register 190 to 1 to show that it will next read from the second entry. Receiving Engine 150 uses S/W read pointer register 190 to detect when message receive buffer is full 500. If incrementing the H/W write pointer register 195 would make H/W read pointer 195a equal to the value in the S/W read pointer register 190, it indicates that message receive buffer 500 is full. In this case, Receiving Engine 150 does not increment the H/W write pointer register 195 or store any incoming messages in message receive buffer 500 until Messaging driver 106 has changed S/W read pointer register 190 indicating that it has finished dealing with one or more entries.

Figure 5C:
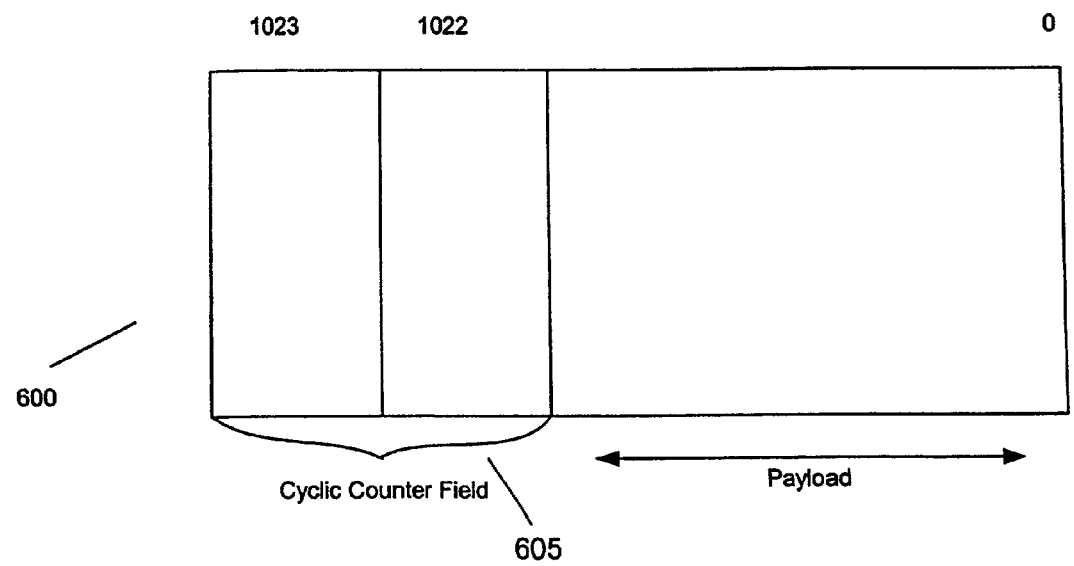
FIG. 5C illustrates a cache-line sized message according to an embodiment of the present invention.
Figure 6:
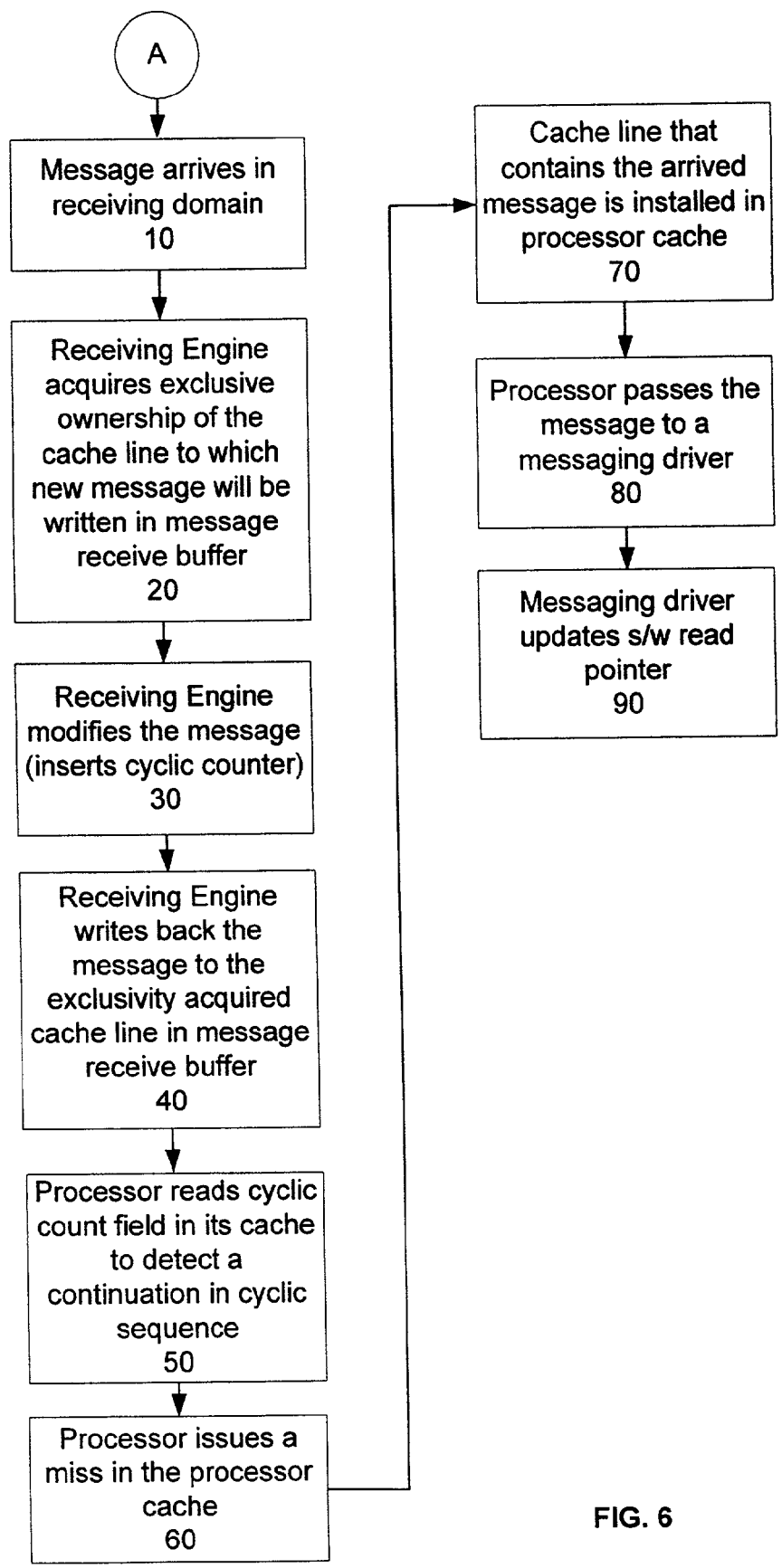
FIG. 6 is a flow chart of a message passing protocol performed by the embodiment of FIG. 1 in the receiving domain.

Referring now to FIG. 5C, there is shown a modified cache line sized message in accordance with an embodiment of the present invention. Cache line sized message 600 shown in FIG. 6 is $2^{10}$ bits (1024 bits) wide. Each cache line sized message preferably has a cyclic count field 605, which is k bits wide. Receiving Engine 150 overwrites cyclic count field 605 with a cyclic counter 170 before the message is written into the message receive buffer 500. Cyclic counter 170 resides in interconnect 125. Cyclic counter 170 is implemented in hardware. In one embodiment of the present invention, cyclic counter 170 is two bits wide. It should be understood that the cyclic counter 170 could be my size. The number of different values generated by cyclic counter 170 and placed in the cyclic count field 605 is relatively prime with respect to the size of message receive buffer 500, which stores $2^W$ cache lines. For example, if k is 2 bits, cyclic counter 170 can store: 00, 10, 01 (which represent digital numbers 0, 1, and 2 respectively). A modulo 3 counter which counts 0, 1, 2, 0, 1, 2, etc. can be used since $2^W$ is not evenly divisible by 3.

Referring now to FIG. 6, there is shown a flow chart of a message passing protocol performed in receiving domain 136. To detect the arrival of a new message, CPU 110 repeatedly polls in its cache 127 a cyclic count field 605 (shown in FIG. 5C) in the next cache line entry in the message receive buffer 500 until cyclic count field 605 has the value next in the cyclic sequence to the value of the count field 605 in the last message received. A new message arrives 10 and receiving engine 150 acquires 20 exclusive ownership of the cache line in message receive buffer 500 to which H/W pointer 195a points and to where Receiving Engine 150 will write the message. Receiving engine 150 invalidates all existing (stale) copies of the cache line in its processor cache 127. Receiving engine 150 modifies 30 the message by overwriting a cyclic count field 605 with cyclic counter 170 and writes 40 the message back to the next cache line in message receive buffer 500.

CPU 110 polls 50 cyclic count field 605 in its cache 127 to detect a continuation of the cyclic sequence. At this point, all existing (stale) copies of the exclusively acquired cache line have been invalidated and CPU 110 issues 60 a cache "miss." The cache line containing the arrived message in message receive buffer 500 is installed 70 in processor cache 127. CPU 110 passes 80 the message to messaging driver 106. Messaging driver 106 updates 90 S/W read pointer 190a to acknowledge receipt of the message from the message receive buffer 500, thereby freeing up space for a new message to be written to message receive buffer 500. Subsequent reads of the cache line hit in processor cache 127 and result in no transaction on CPU 110 interface.

Polling cyclic count field 605 of the cache line in processor cache 127 beneficially allows system 100 to provide an in-memory notification when a cache-line sized message arrives in message receive buffer 500, without polling the H/W write pointer register 195. As a result, no transaction is generated on CPU 110 interface until the message arrives. Maintaining the modulus of cyclic count field 605 relatively prime with respect to the size of message receive buffer 500 guarantees that when a new message is written into message receive buffer 500, a new number will be inserted in the cyclic count field 605. This assures that a break indicating where the last message was written in message receive buffer 500 will always appear when a new message is written.

It should be noted that whenever the S/W read pointer 190a is updated, CPU 110 updates S/W read pointer register 190 in Receiving Engine 150. Receiving Engine 150 determines the number of free entries in message receive buffer 500 by comparing the value of the H/W write register 190 and the S/W read pointer register 190. If message receive buffer 500 is full, no further messages are accepted until space frees up in message receive buffer 500. In one embodiment, messages may be stored in Interconnect 125. In an alternative embodiment, messages may be discarded relying on the messaging driver 106 to detect and retransmit dropped messages.

Figure 7A:
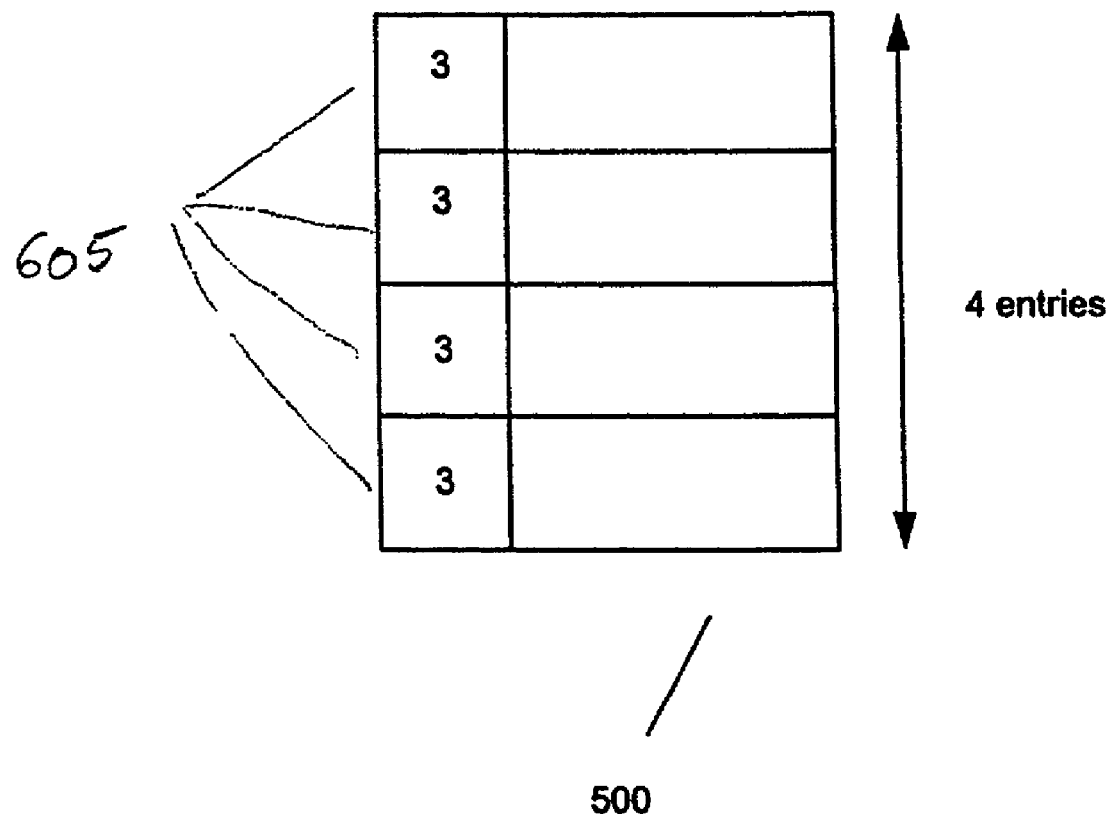
FIGS. 7A–7E are illustrative examples of writing new messages to the message receive buffer.

Referring now to FIGS. 7A–7E, there are shown illustrative examples of writing new cache line sized messages to message receive buffer 500. In this example, the message receive buffer 500 consists of 4 cache line entries, and Cyclic Counter 170 generates a modulo 3 sequence 0, 1, 2, 0, 1, 2 etc. FIG. 7A shows an initial state of message receive buffer 500 with no messages written by the Receiving Engine 150. Messaging driver 106 (not shown in FIG. 7A) has initialized the message receive buffer 500 such that Cyclic count field 605 in all entry slots has a value which does not occur as part of the cyclic sequence—in this case the value is 3.

Figure 7B:
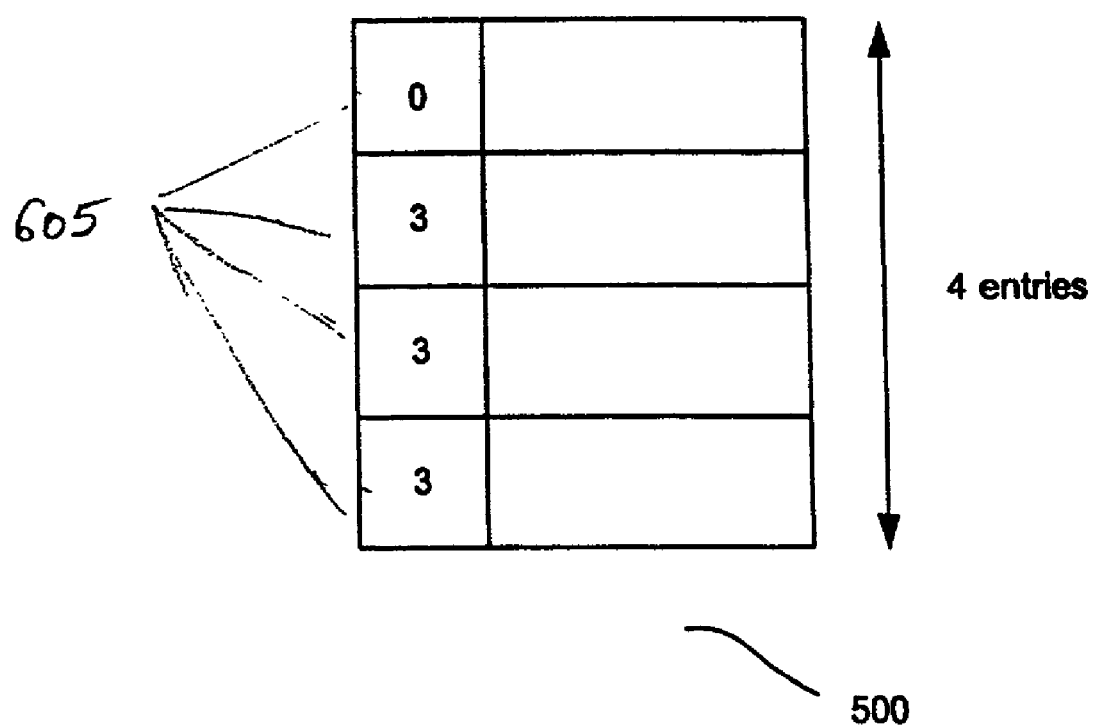

In FIG. 7B, a message has been received in the receiving domain 136, and placed in the first entry of the message receive buffer 500 with a value of 0. The next message has not yet arrived. Messaging driver 106 finishes dealing with the first message in the first entry. For example, Messaging driver 106 copies the message of the Message receive buffer 500 and passes it on to other software. Messaging driver 106 knows that the next message to arrive will be placed in the second entry of the Message receive buffer 500. Since the cyclic count field 605 of the message written to the first entry was 0, Messaging driver 106 knows that the cyclic count field 605 in the second entry will become 1 when the next message has arrived.

To determine whether the next message has arrived, Messaging driver 106 reads the cyclic count field 605 from the second entry. The cache line corresponding to the second entry may or may not already be present in the processor's cache 127 (not shown in FIG. 7B). If it is not present (that is, if it "misses" in the cache 127), CPU 110 (not shown in FIG. 7B) will access the Message receive buffer 500 containing the second entry, and installs the cache line of the second entry into its cache 127. CPU 110 then completes the read of the cyclic count field 605 from the installed cache line in its cache 127. It should be noted that if the cache line was not already present in the cache 127, the processor 110 has had to make an external access to memory node 115 (not shown in FIG. 7B) to obtain the cache line. However, if the cache line was already in the cache 127, no external access was needed.

Since the next message has not yet arrived, the cyclic count field 605 of the second entry does not have the expected value of 1. Messaging driver 106 waits for the next message to arrive by "polling" (that is, by repeatedly reading) the cyclic count field 605 in the second entry, waiting for its value to become 1. The cache line associated with the second entry is now in the processor's cache 127. As a result, these repeated reads all receive their data directly from the processor's cache 127. This is advantageous because for as long as the next message has not arrived, the CPU 110 does not need to make any external accesses to indicate that the message has not yet arrived.

The last message written to Message receive buffer 500 is detected when the cyclic sequence 0, 1, 2, 0, 1, 2 etc. in the cyclic count field 605 of sequentially addressed cache lines is broken. In this example the first entry contains the last message because "3" in cyclic count field 605 of the second entry is not next after 0 in the cyclical sequence.

Figure 7C:
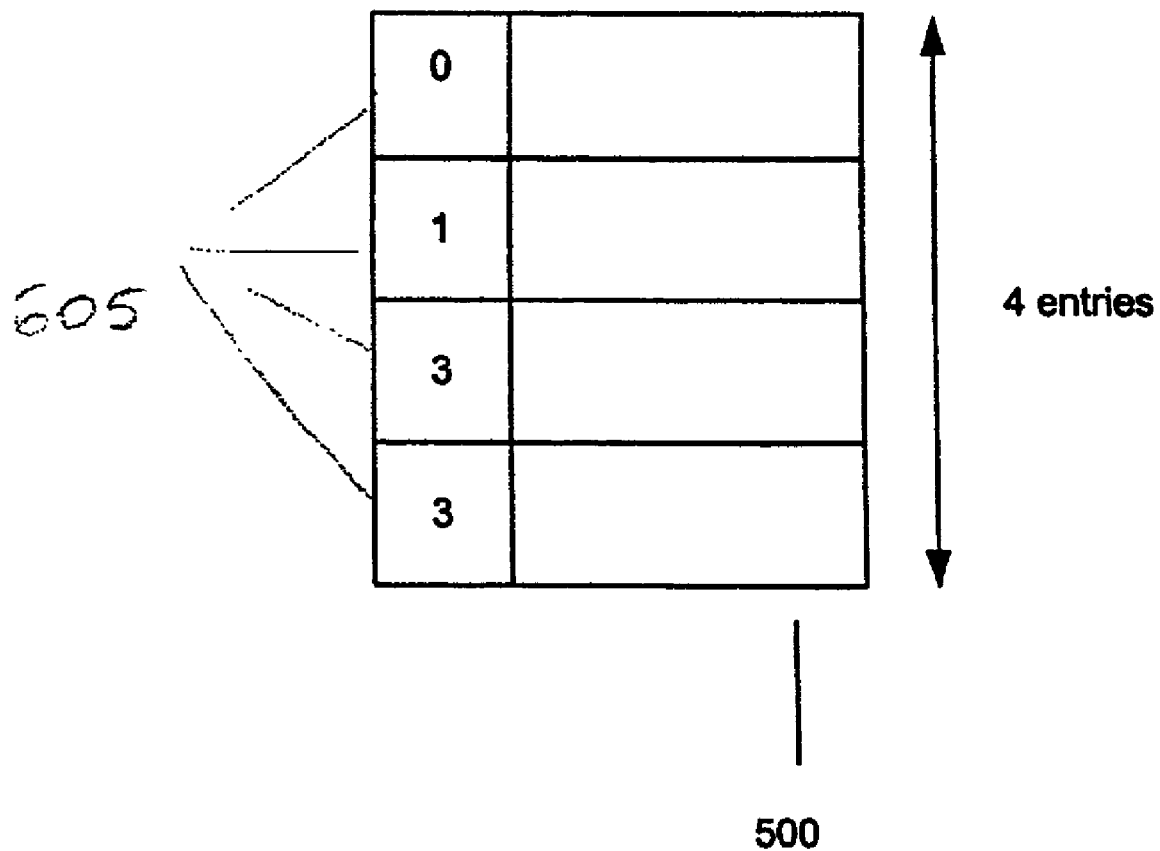

When the next message arrives, the Receive Engine 150 updates the message's cyclic count field 605 to 1 and effectively writes the message to the second entry in the Message receive buffer 500, as shown in FIG. 7C. When Receiving Engine 150 writes the second message, it acquires exclusive ownership of the second entry by invalidating all copies of the entry's cache line in processor cache 127.

In FIG. 7C, after the second message is written in Message receive buffer 500, the cyclic sequence becomes 0, 1, 3, 3. A break in the sequence between 1 and 3 indicates that the second entry contains the last message.

The next polling read of the Cyclic Count Field 605 in the second entry now causes a cache miss, so the processor 110 goes through its external interface to get the new copy of the cache line from the memory. This new copy contains the newly arrived message with its Cyclic Count Field set to 1, so the Messaging driver 106 knows that the next message has arrived and can be read from the second entry in the message receive buffer 500.

It should be understood that in an alternative embodiment, Receiving Engine 150 may announce to all the other caches 127 that it has an updated copy of the cache line, and CPU 110 then gets the new copy from the Receiving Engine's cache (not shown).

Figure 7D:
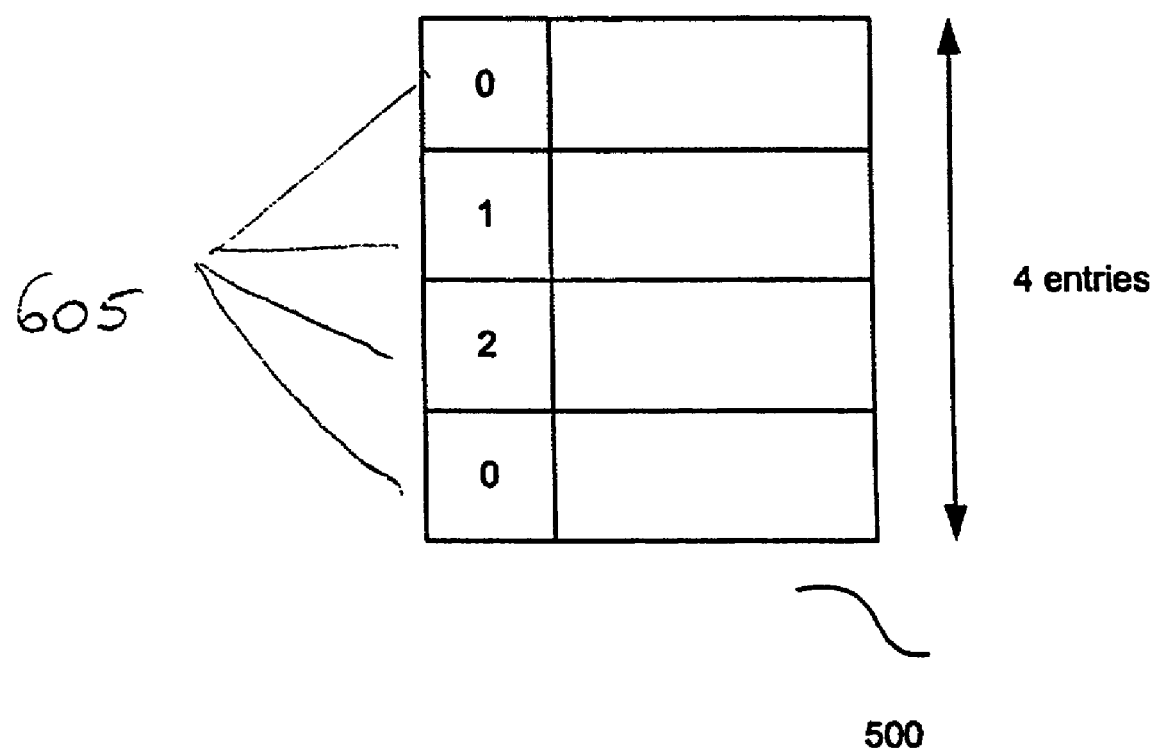

As shown in FIG. 7D, Receive Engine 150 receives the third message, acquires exclusive ownership of the third entry by invalidating the third entry's line in processor's cache 127, modifies the message by inserting "2", the expected value of cyclic counter 605 in the sequence, and writes the message to the third entry. On the next subsequent access, CPU 110 will read the cache line from Message receive buffer 500 and install it in its cache 127. In FIG. 7D, once the fourth message is written into Message receive buffer 500, the cyclic sequence becomes 0, 1, 2, 0. The break in the sequence is now between "0" and "0" indicating that the fourth entry (the last entry in the buffer) contains the last message.

Figure 7E:
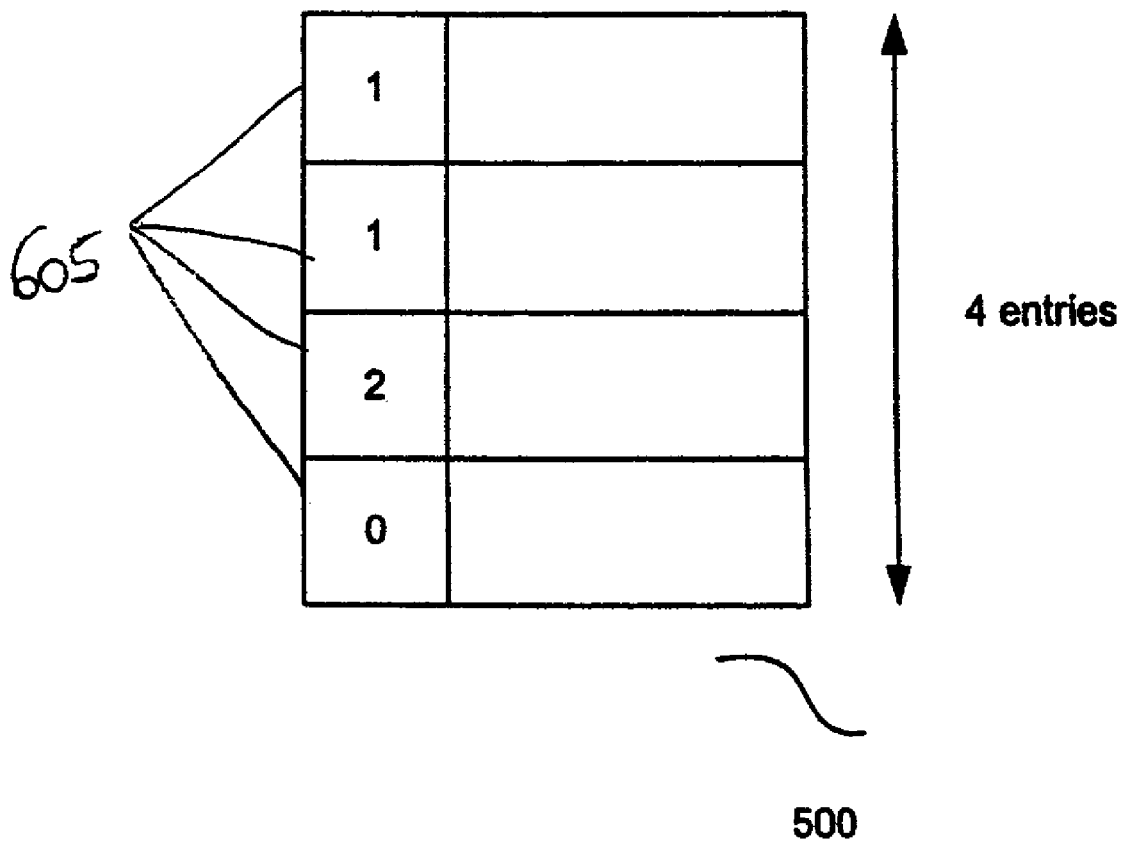

In FIG. 7E, the fifth message has been received. Since the Message receive buffer 500 in this example contains four entries, the fifth message is written to the first entry. The sequence is now 1, 1, 2, 0. The break in the sequence is now between "1" and "1" indicating that the first entry contains the last message. This process continues cyclically.

Inserting cyclic counter 170 advantageously allows system 100 to detect when a new cache-line size message arrives in message receive buffer 500 simply by polling the cyclic count field 605 of the cache line sized message 600 in its processor cache 127. The last message written to the Message receive buffer 500 is detected when the cyclic sequence in the cyclic count field 605 of sequentially addressed cache lines is broken.

Figure 8:
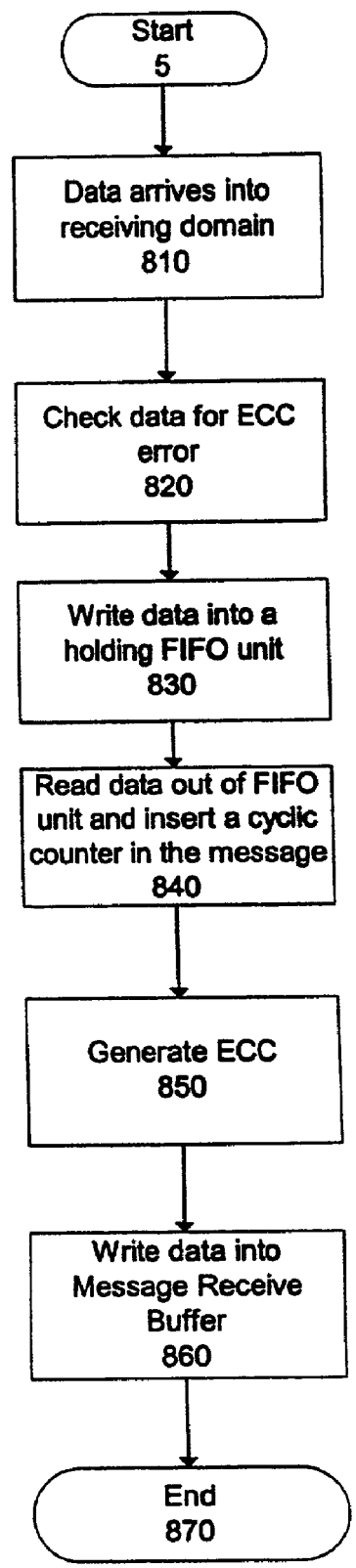
FIG. 8 is a flow chart of a method of inserting a cyclic counter performed by the embodiment of FIG. 1.

Referring now to FIG. 8, there is shown a flow chart of a method of inserting cyclic counter 170. The process starts 805 and the message request arrives 810 in the receiving domain 136. The data in the message is checked 820 for ECC (error correction code) error. ECC encodes information into blocks of bits that contain sufficient detail to permit the recovery of a single error. ECC detects 2, 3, 4-bit errors and notifies System 100 of data corruption. ECC uses 7 bits to protect 32 bits or 8 bits to protect 64 bits. Once the data is checked 820 for ECC error, it is written 830 into a holding FIFO (first in first out) unit residing in the datapath between the Receiving Engine 150 and memory 115. When the data is read out 840 from the FIFO unit, cyclic counter 170 is inserted into the message and a new ECC is regenerated 850. Finally the message is written 860 into message receive buffer 500 and the process ends 870.

What is claimed is:

1. In a multi-node computer system partitioned into a sending domain and a receiving domain, the sending domain and the receiving domain each having a processor node, an I/O node, and a memory node communicatively coupled through an interconnect, a method for message passing between the sending domain and the receiving domain, comprising:

receiving from a processor node, a write request to a memory-mapped input/output (MMIO) window in an address space of the sending domain, the request including an address;

comparing a portion of the address with a value stored in a base register, wherein the value indicates where the MMIO window starts in the address space of the sending domain; and responsive to the portion of the address matching the value in the base register:
decoding the receiving domain;
combining a plurality of write requests; and
responsive to the plurality of the write requests having a cache-line size,
transmitting the cache-line size write request from the sending domain to the receiving domain.

2. The method of claim 1, further comprising combining internally a plurality of processor write requests in the cache-line size write request using a write combining mechanism.

3. In a computer system comprising a sending domain and a receiving domain, the sending domain and the receiving domain each includes a plurality of CPU nodes, each CPU node communicatively coupled to at least one processor cache memory, a method for providing an in-memory notification when a cache-line sized message arrives in the receiving domain, the method comprising repeatedly performed steps of:

receiving the cache-line size message in the receiving domain;

acquiring exclusive ownership of a next cache line entry in a message receive buffer residing in the receiving domain;

modifying a cyclic count field in the received cache-line sized message;

writing the received cache-line size message to the exclusively owned cache line entry in the message receive buffer;

polling the cyclic count field in the at least one processor cache memory to detect a continuation of the cyclic sequence;

issuing a miss in the at least one processor cache memory;

installing the received cache-line sized message in the at least one processor cache memory; and polling the cyclic count field of the cache-line sized message in the at least one processor cache memory to notify when the last message is written to the message receive buffer.

4. The method of claim 3, wherein the last message written in the message receive buffer is detected when a cyclic sequence of the cyclic count field in sequentially addressed cache lines is broken.

5. The method of claim 3, wherein the step of inserting a cyclic counter further comprises overwriting the cyclic counter field with a new value when a new cache line size message is written in the message receive buffer.

6. The method of claim 3, wherein the cyclic counter is a modulo N counter, wherein N is prime with respect to a number of cache lines in the message receive buffer.

7. The method of claim 3, further comprising:
checking the cache-line sized message for error using error correction code (ECC);

writing the cache-line sized message to a holding FIFO unit; and regenerating the ECC code.

8. A multi-node computer system for sending a plurality of messages between a sending domain and a receiving domain connected by an interconnect, the system comprising:

a processor node adapted to issue a write request to a memory-mapped input/output (MMIO) window in an address space of the sending domain, the request including an address;

a sending engine residing in the sending domain adapted to:

compare a portion of the address with a value stored in a base register, wherein the value indicates where the MMIO window starts in the address space of the sending domain, responsive to the portion of the address matching the value in the base register:

decode the receiving domain, combine a plurality of write requests; and responsive to the plurality of the write requests having a cache-line size, transmit a cache-line size write request from the sending domain to the receiving domain.

9. The system of claim 8, further comprising a receiving engine residing in the receiving domain, the receiving engine adapted to write the cache-line size request to a message receive buffer in the receiving domain.

10. The system of claim 8, wherein the address comprises:

a domain field for indicating a receiving domain.

11. The system of claim 8, wherein the address comprises:

a size field indicating a number of cache lines that can be written into the MMIO window.

12. The system of claim 9, wherein the message receive buffer stores $2^W$ cache lines, and wherein the number of stored cache lines is prime with respect to the modulus of a cyclic counter.

* * * * *

UNITED STATES PATENT AND TRADEMARK OFFICE
CERTIFICATE OF CORRECTION

| | | |
|---|---|---|
| PATENT NO. | : 7,194,517 B2 | Page 1 of 1 |
| APPLICATION NO. | : 10/154100 | |
| DATED | : March 20, 2007 | |
| INVENTOR(S) | : Patrick N. Conway et al. | |

It is certified that error appears in the above-identified patent and that said Letters Patent is hereby corrected as shown below:

On title page
Item [57]
Abstract,

Line 10, replace "massaging" with --messaging--.

Signed and Sealed this

Eighth Day of May, 2007

JON W. DUDAS
*Director of the United States Patent and Trademark Office*